United States Patent [19]

Boeder

[11] 4,452,955

[45] Jun. 5, 1984

[54] NOVEL ADHESIVE COMPOSITIONS

[75] Inventor: Charles W. Boeder, Oakdale, Minn.

[73] Assignee: Minnesota Mining & Manufacturing Company, St. Paul, Minn.

[21] Appl. No.: 302,712

[22] Filed: Sep. 16, 1981

[51] Int. Cl.$^3$ .......................... C08K 5/20; C08L 61/06
[52] U.S. Cl. .................... 525/518; 524/323; 524/358; 524/541
[58] Field of Search ............... 525/518; 524/541, 358, 524/323

[56] References Cited

U.S. PATENT DOCUMENTS

| | | | |
|---|---|---|---|
| 2,558,139 | 6/1951 | Knock et al. | 260/45.5 |
| 3,591,438 | 7/1971 | Toback et al. | 156/310 |
| 3,616,040 | 10/1971 | Toback | 156/310 |
| 3,890,407 | 6/1975 | Briggs, Jr. et al. | 260/878 R |
| 4,106,971 | 8/1978 | Briggs, Jr. et al. | 156/310 |
| 4,113,792 | 9/1978 | Pastor et al. | 260/834 |
| 4,170,612 | 10/1979 | Pastor et al. | 525/101 |
| 4,182,644 | 1/1980 | Briggs, Jr. et al. | 156/310 |
| 4,215,209 | 7/1980 | Ray-Chaudhuri et al. | 526/292 |
| 4,226,954 | 10/1980 | Pelosi | 525/259 |
| 4,285,755 | 8/1981 | Piestert et al. | 156/294 |
| 4,316,000 | 2/1982 | Boeder | 526/301 |
| 4,373,077 | 2/1983 | Boeder | 526/309 |

*Primary Examiner*—Allan Lieberman
*Attorney, Agent, or Firm*—Donald M. Sell; James A. Smith; Robert W. Sprague

[57] ABSTRACT

Adhesive compositions are described which consist of an adhesive base as a first part and an initiator portion as a second part, said first part consisting essentially of (a) 100 parts by weight of a polymerizable monomer having at least one $\alpha,\beta$-unsaturated carboxyl functionality; (b) as an accelerator, about 0.05 to 20 parts by weight of a compound selected from the group consisting of organic sulfimides and perfluoroalkylsulfonanilides; and (c) an inhibitor of free-radical polymerization; and the second part comprising a condensation reaction product of an aldehyde and a primary or secondary amine. These compositions may be formulated as adhesives which, for example, exhibit pressure-sensitive properties, which are particularly suitable in hot-melt applications, or which are particularly suitable as structural adhesives. Bonding methods are also described herein.

24 Claims, No Drawings

NOVEL ADHESIVE COMPOSITIONS

BACKGROUND OF THE INVENTION

This invention relates to adhesive compositions.

U.S. Pat. No. 3,591,438 (Toback et al.) discloses employment of a primer containing both a condensation reaction product of an aldehyde and a primary or secondary amine and a reducing activator to accelerate the cure of peroxy-initiated, acrylate-based compositions.

U.S. Pat. No. 3,616,040 (Toback) discloses employment of a condensation reaction product of an aldehyde and a primary or secondary amine to accelerate the cure of peroxy-initiated, acrylate-based compositions.

U.S. Pat. Nos. 3,890,407 and 4,106,971 (both to Briggs et al.) disclose employment of a condensation reaction product of an aldehyde and a primary or secondary amine to cure adhesive compositions comprising a solution of chlorosulfonated polyethylene or mixtures of sulfonyl chlorides and chlorinated polymers in polymerizable vinyl monomers. Other ingredients such as an organic salt of a transition metal, a peroxy compound and a tertiary amine may also be included in the adhesive compositions.

U.S. Pat. Nos. 4,113,792 and 4,170,612 (both to Pastor et al.) discloses employment of a condensation reaction product of an aldehyde and a primary or secondary amine to cure adhesive compositions comprising a pressure sensitive polymer, a chlorosulphonated polyethylene and a polymerizable vinyl compound. Oxidizable transition metals and/or free radical generators may also be included in the adhesive compositions.

U.S. Pat. No. 4,182,644 (Briggs et al.) discloses employment of a condensation reaction product of an aldehyde and a primary or secondary amine to accelerate the cure of adhesive compositions comprising a polymer, a monomer, a free-radical generator and an organic sulfonyl chloride and/or a chlorosulfonated polymer.

SUMMARY OF THE PRESENT INVENTION

The present invention provides novel adhesive compositions consisting of an adhesive base as a first part and an initiator portion as a second part, said first part consisting essentially of (a) 100 parts by weight of a polymerizable monomer having at least one $\alpha,\beta$-unsaturated carboxyl functionality; (b) as an accelerator, about 0.05 to 20 parts by weight of a compound selected from the group consisting of organic sulfimides and perfluoroalkylsulfonanilides; and (c) an inhibitor of free-radical polymerization; and said second part comprising a condensation reaction product of an aldehyde and a primary or secondary amine.

The adhesive compositions of the present invention exhibit prolonged shelf-life while the adhesive base and initiator portion remain unmixed and exhibit a rapid rate of cure on mixing of the two parts.

The adhesive compositions of the present invention may be modified through the inclusion of various types of modifying polymers in order to obtain desired bonding properties. For example, through inclusion of particular types of modifying polymers, compositions in accordance with the present invention are obtained which provide impact-resistant, high-strength bonds on curing and which therefore are particularly suitable as structural adhesives. Also, through inclusion of particular types of modifying polymers, compositions in accordance with the present invention are obtained which exhibit pressure-sensitive properties or which are particularly suitable as hot-melt adhesives.

DETAILED DESCRIPTION OF THE PRESENT INVENTION

The phrase "consisting essentially of" as employed in this application is intended to exclude the presence of the following from the adhesive bases of the compositions of the present invention: peroxy initiators (e.g., peroxides and hydroperoxides); inorganic salt initiators (e.g., persulfates or perchlorates of ammonium, an alkali metal or an alkaline earth metal); amines; and the halogenated compounds (i.e. accelerators) disclosed in co-pending application Ser. No. 302,781, now U.S. Pat. No. 4,404,345, filed of even date and commonly assigned, incorporated herein by reference.

The first part or adhesive base of the compositions of the present invention include 100 parts by weight of a polymerizable monomer (a) having at least one $\alpha,\beta$-unsaturated carboxyl functionality (i.e.,

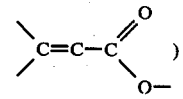

per molecule of monomer. Suitable monomers for employment in the adhesive base include the diacrylates and dimethacrylates described in U.S. Pat. Nos. 3,043,820 (Krieble), 3,457,212 (Fukuoka et al.), 3,923,737 (George et al.), and 3,944,521 (Bradley et al.), incorporated herein by reference. Other suitable polymerizable monomers include acrylate-terminated monomers such as the monomeric polyacrylate esters formed from organic polyisocyanates, such monomers being described, for example, in U.S. Pat. No. 3,425,988 (Gorman et al.), incorporated herein by reference. Particularly suitable polyfunctional acrylates or methacrylates include triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate and bisphenol A bis(2-hydroxypropyl)dimethacrylate.

Monoacrylates and monomethacrylates are also suitable for employment in the adhesive base of the compositions of the present invention as the polymerizable monomer. Suitable monoacrylates and monomethacrylates include cyclohexyl methacrylate, 2-ethylhexyl methacrylate, hydroxyethyl methacrylate, isooctyl acrylate, n-butyl acrylate, hydroxypropyl acrylate, hydroxypropyl methacrylate and tetrahydrofurfuryl methacrylate.

Methacrylic acid and similar $\alpha,\beta$-unsaturated carboxylic acids are also suitable for employment as polymerizable monomers in the adhesive base of the compositions of the present invention as are half-esters such as the 2-hydroxyethyl methacrylate half-ester of maleic acid. Other suitable half-esters include those described in U.S. Pat. Nos. 3,428,614 (Brownstein) and 4,080,238 (Wolinski et al.), incorporated herein by reference.

When a composition is to be applied to a substrate at room temperature and cured at room temperature, the nature of the polymerizable monomer (a) is not critical and the above types of monomers are suitable. However, when a composition is to be employed as a hot-melt adhesive, it is desirable to select as the polymerizable monomer (a) a monomer which exhibits a low vapor pressure at the application temperature. For example, when a composition is to be applied at 110° C., it is preferred that the monomer exhibit a vapor pressure of less than about 1 mm mercury at 150° C. Many of the abovementioned types of polymerizable monomers should be avoided in formulating compositions which are to be employed as hot-melt adhesives.

Suitable polymerizable monomers (a) for employment in the compositions of the present invention which are to be employed as hot-melt adhesives are the abovementioned ethoxylated bisphenol A dimethacrylate, propoxylated bisphenol C dimethacrylate and bisphenol A bis(2-hydroxypropyl)dimethacrylate.

In order to enhance the shelf-life of the compositions of the present invention it may be desirable to remove metal ions, if such are present, from the polymerizable monomer (a). This may be particularly desirable in the event that commercially-obtained monomers, which often contain significant amounts of metal ions, are employed in these compositions. Means for removing metal ions are well known to those skilled in the art.

The adhesive base of the compositions of the present invention may comprise a single type of polymerizable monomer or may comprise a blend of two or more different polymerizable monomers.

The adhesive base of the compositions of the present invention also comprise, as an accelerator, about 0.05 to 20 parts by weight and preferably 0.5 to 10 parts by weight of a compound selected from the group consisting of organic sulfimides and perfluoroalkylsulfonanilides per 100 parts by weight of the polymerizable monomer (a).

Suitable organic sulfimides (i.e., compounds containing the group

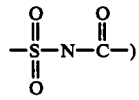

for employment in the compositions of the present invention are of the following general formula (I):

wherein:
R¹ and R² are organic radicals, preferably hydrocarbon groups, comprising 1 to about 10 carbons.

It is to be understood that R¹ and R² of formula (I) may contain any substituent which does not adversely affect the compound for its intended use as an initiator component. It is also to be understood that R¹ and R² of formula (I) can be united to bond the sulfimide group in a heterocyclic or a polynuclear heterocyclic ring system.

Particularly suitable sulfimides for use as the accelerator component are saccharin (i.e., o-benzoic sulfimide) and

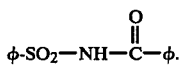

Suitable perfluoroalkyl sulfonanilides for use as the accelerator component have been described in U.S. Pat. Nos. 4,005,141 (Moore et al.) and 4,076,519 (Harrington et al.), incorporated herein by reference, and include trifluoromethanesulfonanilide, 2-phenyltrifluoromethanesulfonanilide and N-2-naphthyltrifluoromethylsulfonanilide, all prepared in a closed reactor as described generally in Method A of said U.S. Pat. No. 4,005,141; 4-trifluoromethyltrifluoromethanesulfonanilide, prepared as described in said U.S. Pat. No. 4,076,519; and 4-phenylthiotrifluoromethanesulfonanilide, prepared as described in said U.S. Pat. No. 4,005,141. Trifluoromethanesulfonanilide is the preferred perfluoroalkylsulfonanilide for employment in the compositions of the present invention.

One advantage of employing perfluoroalkyl sulfonanilides as the accelerator component is that they exhibit greater solubility in the polymerizable monomer (a) than saccharin, the preferred sulfimide.

The compositions of the present invention may comprise a single type of a sulfimide or perfluoroalkyl sulfonanilide, a mixture of two or more different sulfimides or perfluoroalkyl sulfonilides, or a mixture of one or more sulfimides with one or more perfluoroalkyl sulfonanilides.

In order to lengthen the shelf-life of the compositions of the present invention, it is desirable to include in the adhesive bases an inhibitor of free-radical polymerization. The amount of such an inhibitor employed should be chosen to provide compositions which exhibit the desired balance of shelf-life stability and cure-rate. Thus the preferred adhesive bases in accordance with the present invention include about 0.0005 to 0.10 parts by weight and most preferably about 0.001 to 0.03 parts by weight of a conventional quinone-type inhibitor (i.e., quinone and its derivatives) per 100 parts by weight of the polymerizable monomer (a). Preferred quinone-type inhibitors are hydroquinone, methylhydroquinone and benzoquinone. Other suitable quinone-type inhibitors are described in U.S. Pat. No. 4,166,169 (Patel et al.), incorporated herein by reference.

In the case of compositions which are to be employed as hot-melt adhesives, it may be desirable to include a hindered phenol in the adhesive bases as an inhibitor of free-radical polymerization. A suitable amount of a hindered phenol is about 0.1 to 10 parts by weight and preferably about 0.2 to 1.0 parts by weight, both per 100 parts by weight of the polymerizable monomer (a). Examples of suitable phenols are tetrakis-[methylene(3,5-di-tert-butyl-4-hydroxyhydrocinnamate)]methane, thiodiethylene bis-(3,5-di-tert-butyl-4-hydroxy)hydrocinnamate, and octadecyl-3,5-di-tert-butyl-4-hydroxyhydrocinnamate (the aforementioned stabilizers being commercially available under the trade designations "Irganox 1010," "Irganox 1035" and "Irganox 1076," respectively, from Ciba-Geigy). A hindered phenol may be employed as the only inhibitor of free-radical polymerization or may be employed in combination with the abovelisted inhibitors.

Other inhibitors of free-radical polymerization which are well-known in the art may also be used in the adhesive bases of the compositions of the present invention.

In many bonding applications, it may be desirable to achieve bonding characteristics not obtainable with an adhesive base containing only components (a), (b) and (c). Thus, the adhesive base of the compositions of the present invention may further include a modifying polymer in order to obtain desired properties. A suitable amount of such a polymer has been found to be up to about 800 parts by weight per 100 parts by weight of the polymerizable monomer (a). Modifying polymers which may be present in the adhesive base include polymers added to obtain desired viscosities. Other modifying polymers which may be present in the adhesive base include thermoplastic polymers and pressure-sensitive polymers, the latter also generally being thermoplastic in nature. Depending on the properties desired, the modifying polymer may or may not contain reactive functionality. The modifying polymer employed in a composition should be compatible with the polymerizable monomer (a). Additionally, for compositions which are to be employed as hot-melt adhesives, the modifying polymer employed should result in adhesive bases which are flowable at 100° F.

Polymers useful as modifying polymers for providing an adhesive base exhibiting increased viscosity are well-known in the art and include cellulose acetate butyrates, polymethacrylates, phenoxy resins, polyesters and polyurethanes. A preferred modifying polymer for increasing viscosities of the adhesive base is "PKHA Resin" (a phenoxy resin commercially available from Union Carbide). A particularly suitable amount of the modifying polymers for providing an adhesive base exhibiting increased viscosities is up to about 25 parts by weight per 100 parts by weight of the polymerizable monomer (a).

Thermoplastic polymers useful as modifying polymers in the adhesive base are well-known in the art and include those described in U.S. Pat. No. 3,996,308 (Douek et al.), incorporated herein by reference. Examples of particularly suitable thermoplastic polymers include polyvinyl acetates (e.g. that available under the trade designation "AYAT Resin" from Union Carbide); phenoxy resins (e.g., that available under the trade designation "PKHJ Resin" from Union Carbide); polyesters (e.g. that available under the trade designation "Vitel 207" from B. F. Goodrich and that available under the trade designation "49002" from E. I. duPont de Nemours Company); polyurethanes (e.g. that available under the trade designation "Estane 5716" from B. F. Goodrich and that available under the trade designation "3927" from E. I. duPont de Nemours Company); and nitrile rubbers (e.g., that available under the trade designation "Hycar 1072" from B. F. Goodrich).

Thermoplastic polymers which are particularly useful as modifying polymers in compositions to be employed as hot-melt adhesives are the segmented copolyesters described in U.S. Pat. No. 4,059,715 (Pletcher), incorporated herein by reference. These copolyesters consist essentially of from about 5 to 75 percent by weight of amorphous ester units and 95 to 25 percent by weight of crystallizable ester units joined through the ester linkages, the crystallizable ester units being of the formula:

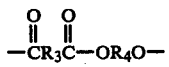

and the amorphous ester units being of the formula:

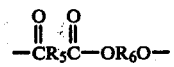

wherein $R_3$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylthioether dicarboxylic acid and 4,4'-diphenylamine dicarboxylic acid, $R_4$ consists of residues of one or more saturated aliphatic diols containing from 2 to 12 carbon atoms, $R_5$ is $R_3$ or $R_7$, $R_6$ is $R_4$ or $R_8$, $R_7$ consists of the divalent radicals containing from about 22 to 50 carbon atoms which remain after removal of the carboxyl groups from saturated aliphatic dimer acids and $R_8$ consists of the divalent radicals remaining after removal of the hydroxyl groups of long chain aliphatic diols having an average molecular weight of 200 to 4000, provided that at least one of $R_5$ and $R_6$ in each amorphous ester unit is $R_7$ or $R_8$, and provided that when $R_3$ is aromatic, $R_4$ contains from 6 to 12 carbon atoms and the amorphous content is 50–75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C., an open time of at least about ¼ minute at 20° C., substantially complete solubility in toluene at 25° C. in the ratio of about 10 percent by weight of copolyester and 90% by weight of solvent, a tensile strength of 100–400 kg/cm$^2$, an elongation at break of 400–1000 percent, a T-peel adhesion to vinyl of at least 0.9 kg/cm of width and a DTA glass transition temperature, $T_g$, below $-25°$ C.

Pressure-sensitive polymers useful as modifying polymers in the adhesive base include those described in U.S. Pat. No. Re. 24,906 (Ulrich) and U.S. Pat. No. 4,113,792 (Pastor et al.), both incorporated herein by reference. Examples of particularly suitable pressure-sensitive polymers include the copolymer of isobutyl acrylate (90% by weight) and acrylic acid (10% by weight); the copolymer of isooctyl acrylate (90%) and acrylic acid (10%); the copolymer of n-butyl acrylate (90%) and acrylic acid (10%), the terpolymer of n-butyl acrylate (80%), N-vinyl pyrrolidone (10%), and acrylic acid (10%); the terpolymer of n-butyl acrylate (80%), ethyl acrylate (10%), and acrylic acid (10%); and the terpolymer of isobutyl acrylate (85%), acrylic acid (10%) and n-butyl acrylate (5%).

A particularly suitable amount of thermoplastic or pressure-sensitive modifying polymers for employment in the adhesive base of the compositions of the present invention is from about 100 to 400 parts by weight per 100 parts by weight of the polymerizable monomer (a).

An adhesive base which contains the various modifying polymers discussed above may further comprise the various tackifiers, plasticizers and the like which are well known in the art in order to obtain desired properties. Particularly suitable plasticizers are butylbenzyl phthalate and dioctyl phthalate.

An adhesive base containing modifying polymers may be conveniently applied to surfaces as viscous neat liquids, sheets, films, tapes and the like, or as solutions in suitable organic solvents. Depending on the type of modifying polymer employed in the adhesive base, fixturing of the surfaces involved in the bonding operation may or may not be necessary.

It is understood that the adhesive base of the present invention may also comprise various other ingredients as fillers. Fillers may be included in the adhesive base in amounts up to about 50 parts by weight per 100 parts by weight of the polymerizable monomer (a). Specific examples of fillers which may be included in these compositions are clays, talcs, carbon black, fumed silicas, alumina, powdered alumina, pigments, and dyes.

The second part or initiator portion of the adhesive compositions of the present invention contains a condensation reaction product of an aldehyde and a primary or secondary amine. Suitable condensation reaction products are well-known in the art and include those described in U.S. Pat. No. 3,616,040 (Toback), incorporated herein by reference.

The type of aldehyde employed in the practice of the present invention is not believed to be critical. Suitable aldehydes comprise 1 to about 12 carbon atoms and may be aliphatic or aromatic aldehydes. Aliphatic aldehydes are the preferred aldehydes for preparing the condensation reaction products.

Examples of suitable aldehydes are formaldehyde, acetaldehyde, propionaldehyde, butyraldehyde, heptaldehyde, hexaldehyde, crotonaldehyde, cinnamic aldehyde, hydrocinnamic aldehyde, 2-phenylpropionaldehyde, benzaldehyde and naphthaldehyde.

The type of primary or secondary amine employed in the practice of the present invention is also not believed to be critical. Generally, the amines employed herein are of the formula

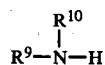

wherein:
$R^9$ is selected from the group consisting of hydrogen and hydrocarbon radicals of 1 to about 12 carbons; and
$R^{10}$ is a hydrocarbon radical of 1 to about 12 carbons. $R^9$ and $R^{10}$ may be unsubstituted or substituted hydrocarbon radicals and may be aliphatic or aromatic in nature.

Examples of suitable primary amines are ethyl amine, n-butyl amine, n-propyl amine, isopropyl amine, n-hexyl amine, t-butyl amine, aniline, p-anisidine, p-toluidine, xylidene, benzylamine, p-benzylaniline. Examples of suitable secondary amines are diethylamine, dipropylamine, diisopropylamine, diphenylamine, N-phenyl benzylamine and N-allylaniline.

A specific example of a suitable condensation reaction product is a condensation reaction product of butyraldehyde and n-butylamine (e.g., that commercially available under the trade designation "Vanax 833" from R. T. Vanderbilt Chemical Company). A preferred condensation reaction product is a condensation reaction product of butyraldehyde and aniline (e.g., that commercially available under the trade designation "Vanax 808" from R. T. Vanderbilt Chemical Company).

The amine-aldehyde condensation reaction product may be employed by itself as the initiator portion or, alternatively, it may be dissolved in or combined with a suitable carrier. Examples of suitable carriers include volatile organic solvents (e.g., methylene chloride) which provide solutions that may be conveniently applied to a substrate, for example, as an aerosol. Still other examples of suitable carriers include waxes and the like which may be combined with the initiator to form, for example, convenient-to-use wax pencils.

When bonding substrates, the initiator portion of a composition of the present invention is simply applied to at least one of the substrates to be bonded and the adhesive base is applied to the same substrate, to the other substrate or to both substrates. When both the adhesive base and the initiator portion are applied to the same substrate, it is preferred that the initiator portion be applied to that substrate prior to application of the adhesive base. Also, in the event that the two parts of the composition are applied to the same substrate, one should proceed quickly with the bonding operation. However, when each part is applied to a different substrate, these substrates may be individually stored for prolonged periods, if such is desired, prior to bonding. In either situation, the substrates are simply brought into abutting relation when it is desired to form the bond and are maintained in that relation until the adhesive composition polymerizes and bonds the substrates together. Depending on the composition employed, fixturing (i.e., clamping) of the substrates may be necessary until polymerization of the composition has occurred to provide sufficient bond strength between the substrates.

In the following examples which will serve to illustrate the present invention all parts are parts by weight and all percentages are percentages by weight, unless otherwise indicated.

TEST METHODS

Test Method A

Fixture Time

In testing the performance of a composition, one drop (about 0.05 cc) of an adhesive base is placed on a solvent-wiped 1 inch×4 inch cold-rolled steel coupon. A second like coupon is treated with a light coating of the initiator portion and is brought into contact with the first coupon is a manner such that the area of adhesive contact measures about one-half square inch. The fixture time (i.e., the time at which the coupons could no longer be separated using hand strength only) is measured.

Test Method B

Overlap Shear—Pressure-Sensitive Compositions

In testing the performance of a pressure-sensitive composition, the adhesive base is applied to an etched aluminum strip to give a coating which, when dry, is about 3 mil (when dry) in thickness. The etched aluminum strip is then brought into contact with a second etched aluminum strip such that the area of adhesive bonding between the two strips measures 1-inch$^2$ (6.45 cm$^2$). This second strip has previously been coated with a light coat of an initiator portion. The bond is allowed to condition for 1 to 48 hours, at which time the overlap shear value (given in pounds per square inch) is determined either at room temperature or at 180° F. using an Instron Dynamic Tester operated at a jaw separation rate of 1 inch (2.54 cm) per minute.

Test Method C

Overlap Shear—Hot-Melt Compositions

In testing the performance of a hot-melt composition, a 3-mil coating of the adhesive base is applied to an etched aluminum strip which has been heated to 200° F. The aluminum strip is then brought into contact with a second heated, etched aluminum strip such that the area of adhesive bonding between the two strips measures ½ inch$^2$ (3.23 cm$^2$). This second strip has previously been coated with a light coating of an initiator portion. The bond is allowed to condition for 1 to 48 hours at which time the overlap shear value (given in pounds per square inch) is determined either at room temperature or at 180° F. using an Instrom Dynamic Tester operated at a jaw separation rate of 1 inch (2.54 cm) per minute.

EXAMPLE 1

A suitable adhesive composition comprises an adhesive base and an initiator portion comprising the following ingredients:

| | Parts by Weight |
|---|---|
| Adhesive Base | |
| The reaction product of "Polymeg 2000" (a polytetramethylene oxide diol, commercially available from E. I. duPont de Nemours and Company) and isocyanatoethyl methacrylate (commercially available from Dow Chemical Company) | 12.5 |
| Hydroxyethyl methacrylate | 10 |
| Methacrylic acid | 4.5 |
| Saccharin | 2.7 |
| Initiator Portion | |
| "Vanax 808" (condensation reaction product of n-butyraldehyde and aniline; commercially available from R. T. Vanderbilt Chemical Company) | 2 |
| Methylene chloride | 98 |

When tested in accordance with Test Method A, the composition of this example exhibited a fixture time of about 4 minutes.

When tested in accordance with Test Method B, the composition of this example gave an overlap shear value of 800 pounds per square inch.

EXAMPLE 2

Another suitable adhesive composition comprises an adhesive base comprising the following ingredients:

| | Parts by Weight |
|---|---|
| Segmented copolyester prepared from dimethylterephthalate, 1,6-hexanediol and a poly(oxytetramethylene) glycol having a molecular weight of about 2000, the mole ratio of the diols being about 80:20, respectively. The copolyester has an amorphous content of about 68%. | 10 |
| "Epocryl 12" (a reaction product of methacrylic acid and an epoxy resin; commercially available from Shell Chemical Company) | 10 |
| Trifluoromethanesulfonanilide | 0.4 |

The initiator portion employed with the above described adhesive base was that employed in Example 1 above.

When tested in accordance with Test Method C, the composition of this example gave the following overlap shear values at the times and under the conditions indicated.

| Time | Testing Temperature | Overlap Shear Value (pounds per square inch) |
|---|---|---|
| 1 hour | room temperature | 120 |
| 4 hours | room temperature | 250 |
| 24 hours | room temperature | 720 |
| 24 hours | 180° F. | 180 |

EXAMPLE 3

A suitable composition comprises an adhesive base and initiator portion comprising the following ingredients:

| | Parts by Weight |
|---|---|
| Adhesive Base | |
| Segmented copolyester described in Example 2 above | 9.0 |
| "Epocryl 12" | 10.0 |
| "Santicizer 160" (butylbenzyl phthalate, commercially available from Monsanto) | 1.0 |
| Saccharin | 0.4 |
| "Irganox 1010" | 0.02 |
| Initiator Portion | |
| "Vanax 833" (a condensation reaction product of butyraldehyde and n-butyl amine, commercially available from E. I. duPont de Nemours and Company, Inc.) | 2 |
| Methylene chloride | 98 |

When tested in accordance with Test Method C, the composition of this example gave the following overlap shear values at 24 hours when tested under the conditions indicated.

| Testing Temperature | Overlap Shear (pounds per square inch) |
|---|---|
| Room temperature | 420 |
| 180° F. | 115 |

EXAMPLES 4–6

Suitable adhesive compositions comprise pressure-sensitive adhesive bases prepared from the following ingredients:

| | Parts by Weight | | |
|---|---|---|---|
| | Ex. 4 | Ex. 5 | Ex. 6 |
| Isooctyl acrylate (90)/acrylic acid (10) copolymer | 7 | — | — |
| Isobutyl acrylate (90)/acrylic acid (10) copolymer | — | 7 | — |
| Isobutyl acrylate (85)/acrylic acid (10)/n-butyl acrylate (5) terpolymer | — | — | 7 |
| "Epocryl 12" | 2 | 2 | 2 |
| Methacrylic acid (commercially available from Rohm and Haas Company) | 2 | 2 | 2 |
| Saccharin | 0.4 | 0.4 | 0.4 |
| Acetone | 10.5 | 10.5 | 10.5 |

The initiator portion employed with the adhesive bases of Examples 4, 5 and 6 was that employed in Example 1 above.

When tested in accordance with Test Method B, adhesive compositions of Examples 4, 5 and 6 gave the following overlap shear values, at the times indicated. Results are also included for adhesive compositions comprising adhesive bases of Examples 4, 5 and 6 except that no accelerator (i.e., saccharin) was contained therein. The overlap shear values were determined at room temperature.

| | Overlap Shear Value (pounds per square inch) | | | | | |
|---|---|---|---|---|---|---|
| Time | Ex. 4 | Ex. 4 without accelerator | Ex. 5 | Ex. 5 without accelerator | Ex. 6 | Ex. 6 without accelerator |
| 1 hour | — | — | — | — | 450 | 50 |
| 4 hours | — | — | — | — | 650 | 120 |
| 24 hours | — | — | — | — | 840 | 650 |
| 48 hours | 720 | 160 | 1100 | 350 | — | — |

EXAMPLES 7–13

In demonstrating the effect of the level of saccharin on the performance of compositions of the present invention, the following adhesive bases were prepared:

| | Parts by Weight | | | | | | |
|---|---|---|---|---|---|---|---|
| | Ex. 7 | Ex. 8 | Ex. 9 | Ex. 10 | Ex. 11 | Ex. 12 | Ex. 13 |
| Segmented copolyester described in Example 2 above | 10 | 10 | 10 | 10 | 10 | 10 | 10 |
| "Epocryl 12" | 10 | 10 | 10 | 10 | 10 | 10 | 10 |
| Saccharin | 0.8 | 0.6 | 0.4 | 0.2 | 0.1 | 0.05 | 0.01 |

The initiator portion employed in Examples 7–13 was that employed in Example 1 above.

When tested in accordance with Test Method C, the adhesive compositions of Examples 7–13 gave the following overlap shear values, at the times indicated.

| | | Overlap Shear Value (pounds per square inch) | | | | | | |
|---|---|---|---|---|---|---|---|---|
| Time | Testing temperature | Ex. 7 | Ex. 8 | Ex. 9 | Ex. 10 | Ex. 11 | Ex. 12 | Ex. 13 |
| 4 hrs | room temperature | 280 | 320 | 240 | 320 | 380 | 265 | 285 |
| 8 hrs | room temperature | 420 | 500 | 410 | 480 | 450 | 420 | 390 |
| 24 hrs | room temperature | 680 | 830 | 730 | 780 | 750 | 720 | 710 |
| 24 hrs | 180° F. | 180 | 195 | 240 | 280 | 250 | 315 | 290 |

EXAMPLE 14

By way of comparison, adhesive bases comprising the following ingredients were prepared:

| | Parts by Weight | | |
|---|---|---|---|
| | A | B | C |
| Segmented copolyester described in Example 3 above | 10 | 10 | 10 |
| "Epocryl 12" | 10 | 10 | 10 |
| Saccharin | 0.4 | — | — |
| "Hypalon 20" (chlorosulfonated polyethylene; commercially available from E. I. duPont de Nemours Co.) | — | 0.4 | — |

The initiator portion employed with the above adhesive bases A–C was that employed in Example 1 above.

When tested in accordance with Test Method A, adhesive compositions comprising adhesive bases A–C gave the following overlap shear values at the times indicated. Results are also included where no initiator portion was employed with adhesive base C.

| | | Overlap Shear Value Adhesive Base | | | |
|---|---|---|---|---|---|
| Time | Testing temperature | A | B | C | C without initiator |
| 1 hr | room temperature | 320 | — | 50 | 30 |
| 4 hrs | room temperature | 550 | 200 | 90 | 40 |
| 8 hrs | room temperature | 350 | 250 | 220 | 45 |
| 24 hrs | room temperature | 950 | 680 | 520 | 100 |
| 24 hrs | 180° C. | 265 | 190 | 120 | 0 |

As is apparent from the above results, the adhesive base A which contained saccharin performed better than the adhesive bases B which contained "Hypalon 20". Also, adhesive base A performed better than adhesive base C which contained no accelerator, both when the initiator portion was employed with adhesive base C and when it was not.

What is claimed is:

1. An adhesive composition consisting of an adhesive base as a first part and an initiator portion as a second part, said first part consisting essentially of (a) 100 parts by weight of a polymerizable monomer having at least one $\alpha,\beta$-unsaturated carboxyl functionality; (b) as an accelerator, about 0.05 to 20 parts by weight of a compound selected from the group consisting of an organic sulfimide and a perfluoroalkylsulfonanilide; and (c) an effective amount of an inihibitor of free-radical polymerization to retard polymerization of said first part prior to contact of said second part therewith and to permit a desirable cure-rate after contact; and said second part comprising a condensation reaction product of an aldehyde and a primary or secondary amine; said adhesive composition being capable of polymerizing to form an adhesive bond upon contact of said first part with said second part.

2. A composition in accordance with claim 1, wherein said monomer is selected from the group consisting of triethyleneglycol dimethacrylate, ethyleneglycol dimethacrylate, tetraethyleneglycol dimethacrylate, polyethyleneglycol dimethacrylate, polyethylene glycol diacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate, bisphenol A bis(2-hydroxypropyl)dimethacrylate, cyclohexyl methacrylate, 2-ethylhexyl methacrylate, hydroxyethyl methacrylate, isooctyl acrylate, n-butyl acrylate, hydroxypropyl acrylate, hydroxylpropyl methacrylate, tetrahydrofurfuryl methacrylate, methacrylic acid, the 2-hydroxyethyl methacrylate half-ester of maleic acid, and monomeric polyacrylate esters formed from isocyanates.

3. A composition in accordance with claim 1, wherein said accelerator is present in an amount of about 0.5 to 10 parts by weight.

4. A composition in accordance with claim 1, wherein said accelerator is a sulfimide of the formula:

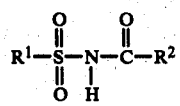

wherein:
R[1] and R[2] are hydrocarbon groups comprising 1 to about 10 carbons.

5. A composition in accordance with claim 4, wherein said sulfimide is selected from the group consisting of o-benzoic sulfimide and

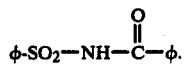

6. A composition in accordance with claim 1, wherein said accelerator is a perfluoroalkylsulfonanilide.

7. A composition in accordance with claim 6, wherein said perfluoroalkylsulfonanilide is selected from the group consisting of trifluoromethanesulfonanilide, 4-trifluoromethyltrifluoromethanesulfonanilide, 2-phenyltrifluoromethanesulfonanilide, 4-phenylthiotrifluoromethanesulfonanilide and N-2-naphthyltrifluoromethylsulfonanilide.

8. A composition in accordance with claim 1, wherein said aldehyde comprises 1 to about 12 carbons and said amine is of the formula:

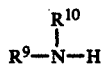

wherein:
R[9] is selected from the group consisting of hydrogen and hydrocarbon radicals of 1 to about 12 carbons; and
R[10] is a hydrocarbon radical of 1 to about 12 carbons.

9. A composition in accordance with claim 8, wherein said aldehyde is an aliphatic aldehyde.

10. A composition in accordance with claim 8, wherein said aldehyde is selected from the group consisting of formaldehyde, acetaldehyde, propionaldehyde, butyraldehyde, heptaldehyde, hexaldehyde, crotonaldehyde, cinnamic aldehyde, hydrocinnaminc aldehyde, 2-phenylpropionaldehyde, benzaldehyde and naphthaldehyde.

11. A composition in accordance with claim 8, wherein said amine is selected from the group consisting of ethylamine, n-butyl amine, n-propyl amine, isopropyl amine, n-hexyl amine, t-butyl amine, aniline, p-anisidine, p-toluidine xylidene, benzylamine, p-benzylaniline, diethylamine, dipropylamine, diisopropylamine, diphenylamine, N-phenyl benzylamine and N-allylaniline.

12. A composition in accordance with claim 1, wherein said condensation reaction product of an aldehyde and a primary or secondary amine is selected from the group consisting of condensation reaction products of butyraldehyde and n-butyl amine and condensation reaction products of butyraldehyde and aniline.

13. A composition in accordance with claim 1, wherein said initiator portion contains a volatile organic solvent.

14. A composition in accordance with claim 1, wherein said adhesive base further contains up to about 800 parts by weight of a modifying polymer selected from the group consisting of a polymer which increases the viscosity of said adhesive base, a polymer which provides the composition with pressure-sensitive properties and a polymer which provides impact-resistant, high-strength bonds on curing.

15. A composition in accordance with claim 14, wherein said monomer exhibits a vapor pressure of less than about 1 mm mercury at 150° C. and wherein said modifying polymer is a segmented copolyester consisting essentially of from about 5 to 75 percent by weight of amorphous ester units and 95 to 25 percent by weight of crystallizable ester units joined through ester linkages, the crystallizable ester units being of the formula:

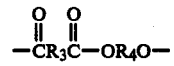

and the amorphous ester units being of the formula:

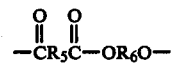

wherein R[3] consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylthioether dicarboxylic acid and 4,4'-diphenylamine dicarboxylic acid, R[4] consists of residues of one or more saturated aliphatic diols containing from 2 to 12 carbon atoms, R[5] is R[3] or R[7], R[6] is R[4] or R[8], R[7] consists of the divalent radicals containing from about 22 to 50 carbon atoms which remain after removal of the carboxyl groups from saturated aliphatic dimer acids and R[8] consists of the divalent radicals remaining after removal of the hydroxyl groups of long chain aliphatic diols having an average molecular weight of 200 to 4000, provided that at least one of R[5] and R[6] in each amorphous ester unit is R[7] or R[8] and provided that when R[3] is aromatic, R[4] contains from 6 to 12 carbon atoms and the amorphous content is 50–75 percent by weight, the said copolyester having a DTA melting temperature of from about 25° to 150° C., an inherent viscosity of at least 0.5 gl/g at 25° C., as measured in 0.3 g/dl solutions of polymer in chloroform at 25° C., an open time of at least about ¼ minute at 20° C., substantially complete solubility in toluene at 25° C. in the ratio of about 10 percent by weight of copolyester and 90% by weight of solvent, a tensile strength of 100–400 kg/cm[2], an elongation at break of 400–1000 percent, a T-peel adhesion to vinyl of at least 0.9 kg/cm of width and a DTA glass transition temperature, $T_g$, below −25° C.

16. A composition in accordance with claim 15, wherein said segmented copolyester is present in an amount of about 100 to 400 parts by weight.

17. A composition in accordance with claim 1, wherein said inhibitor of free-radical polymerization is a quinone-type inhibitor which is present in an amount of about 0.0005 to 0.10 parts by weight.

18. A composition in accordance with claim 17, wherein said quinone-type inhibitor is present in an amount of about 0.001 to 0.03.

19. A composition in accordance with claim 18, wherein said quinone-type inhibitor is selected from the group consisting of hydroquinone, methylhydroquinone and benzoquinone.

20. A composition in accordance with claim 1, wherein said inhibitor of free-radical polymerization is a hindered phenol which is present in an amount of about 0.1 to 10 parts by weight.

21. A composition in accordance with claim 20, wherein said hindered phenol is present in an amount of about 0.2 to 1.0 parts by weight.

22. A composition in accordance with claim 20, wherein said hindered phenol is selected from the group consisting of tetrakis-[methylene(3,5-di-tert-butyl-4-hydroxyhydrocinnamate)]methane, thiodiethylene bis-(3,5-di-tert-butyl-4-hydroxy)hydrocinnamate, and octadehyl-3,5-di-tert-butyl-4-hydroxyhydrocinnamate.

23. A composition in accordance with claim 1, wherein said adhesive base comprises both a quinone-type inhibitor and a hindered phenol.

24. A composition in accordance with claim 1, wherein said composition further contains up to about 50 parts by weight of filter.

* * * * *